(12) United States Patent
Madour et al.

(10) Patent No.: US 6,266,405 B1
(45) Date of Patent: Jul. 24, 2001

(54) EXTENDED NUMBER PORTABILITY DATABASE SERVICES

(75) Inventors: Lila Madour; Shabnam Sultana, both of Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/221,165

(22) Filed: Dec. 28, 1998

(51) Int. Cl.[7] .............................. H04M 3/42; H04M 3/54; H04M 7/00; H04L 12/66; H04L 12/28

(52) U.S. Cl. .................... 379/207; 370/355; 370/356; 370/389; 370/401; 379/211; 379/220; 379/900

(58) Field of Search ...................... 379/207, 211, 379/219, 220, 230, 900; 370/352, 353, 354, 355, 356, 389, 401

(56) References Cited

U.S. PATENT DOCUMENTS 6,021,126 * 2/2000 White et al. ..................... 370/352

FOREIGN PATENT DOCUMENTS

| 0 781 015 | 6/1997 | (EP) | H04L/29/06 |
|---|---|---|---|
| WO97/27717 | 7/1997 | (WO) | H04Q/7/38 |
| 97 48050 | 12/1997 | (WO) | G06F/13/00 |
| WO98/18269 | 4/1998 | (WO) | H04Q/3/00 |

* cited by examiner

Primary Examiner—Harry S. Hong
(74) Attorney, Agent, or Firm—Burns, Doane, Swecker & Mathis, L.L.P.

(57) ABSTRACT

A system and method for providing portability of internet addressing maintains additional IP addressing information in number portability databases located throughout provider domains in a telecommunications network. This additional IP addressing information, in conjunction with additional Number Portability Request messaging information, permits portability of addresses across telecommunication and data communication networks in a transparent fashion.

20 Claims, 5 Drawing Sheets

EXTENDED NUMBER PORTABILITY DATABASE SERVICES

BACKGROUND

Applicants' invention relates generally to number portability in telecommunications systems and, more particularly, to techniques for providing number portability towards Internet service providers.

Number portability in telecommunication systems typically permits end users (i.e., mobile subscribers) to retain the same telephone numbers whenever the end users change from one telecommunication service provider/operator domain to another telecommunication service provider/operator domain. Without number portability, service providers will be unable to accommodate the relocation of a mobile subscriber from one service provider to another without changing the subscriber's directory telephone number.

Changing a directory telephone number in the event of relocation of a subscriber occasions expense and effort for both the subscriber and the telecommunications provider. For the provider, it is an expensive process to administer the changes of directory telephone numbers when a subscriber relocates from one area to another. The administration required by the provider includes both efforts to define available new numbers in the new location and to update the existing directory. The relocated subscriber also incurs expense in providing notice of the new directory number to potential callers (friends and business contacts). If such notice is not provided or retained by the potential callers, calls may not be placed to the relocated subscriber. Loss of calls to a relocated subscriber can result in loss of social or business opportunity. Thus, number portability is advantageous in that it permits relocated mobile subscribers, who have changed service providers, to receive calls that otherwise might be directed to the wrong service provider and therefore would be lost.

For an understanding of number portability, a conventional telecommunications network 10 is shown in FIG. 1 and is described below. Network 10 includes a set of service provider domains 20A–20C and 20F. Three of the domains (particularly domains 20A–20C) are mobile telecommunications domains serving mobile stations; domain 20F serves fixed stations. In the illustrated network, domain 20F can be of a network type such as a public switched network (PSTN) or integrated services digital network (ISDN), for example. At least some of the areas served by domains 20 can be, and likely are, geographically coextensive. Some of the domains 20 may also be served by differing service providers, e.g., different telecommunications operating companies.

Fixed station domain 20F includes at least one local exchange 22F. Local exchange 22F is connected to a plurality of fixed subscriber stations, only one of which (subscriber 24) is shown in FIG. 1. Local exchange 22F is connected either directly or ultimately (e.g., via transit exchanges) to a gateway exchange or gateway node 26F. Gateway node 26F is connected to a database 30F. Database 30F is, in turn, connected (e.g., for updating and maintenance purpose) to a service management system 32F.

Mobile telecommunications domains 20A–20C each have respective gateway nodes 26A–26C, each of which takes the form of gateway mobile services switching center (GMSC) and accordingly are respectively referred to as GMSCs 26A–26C.

Each gateway node GMSC 26 serves as an interface to external domains 20 for one or more mobile services switching centers (MSCs) 40 which belong to the domain.

Although any given domain likely has a plurality of MSCs 20, only a single MSC 40 is shown in domains 20 for purposes of illustration. Each GMSC 26 is connected to the MSCs 40 in its domain; MSCs 40 in the same domain may also be connected. Each MSC 40 in FIG. 1 is connected to serve at least one and preferably a plurality of base station controllers (BSCs) 50. For example, MSC 40A serves base station controllers 50A-1 through 50A-m; MSC 40B(1) serves base station controllers 50B(1)-1 through 50B(1)-m. It should be understood that, typically, differing MSCs 40 serve a differing number of base station controllers 50. The use of BSCs 50, shown in the Figures, is for purposes of illustration. It will be recognized that each MSC 40 can directly serve the BSs 60 without any intermediary BSCs 50 in some mobile systems (e.g., TDMA according to IS-136).

Each base station controller 50 is connected to one or more base transceiver stations (BS) 60A-1 through 60A-l(q). The number of base transceiver stations (BS) 60 per base station controller 50 can vary.

Each base transceiver stations (BS) 60 transmits and receives radio frequency communications to and from a plurality of mobile subscribers (MS) 70 in the geographical areas served by the respective BS 60. For sake of simplicity and illustration, only one mobile station 70 is shown in FIG. 1, although it should be understood that each domain 20 serves hundreds if not thousands of unillustrated mobile stations. The particular mobile station 70 depicted in FIG. 1 is shown as being served by base transceiver station (BS) 60A-m(q).

Mobile telecommunications domains 20A–20C each include respective databases 30A–30C. Databases 30A–30C are connected to and maintained by service management systems 32A–32C, respectively. Service management systems 32A–32C are connected to and supervised by a master management system 32M.

Databases 30 are subscriber location servers which are augmented with additional intelligence and are known as mobile subscriber number portability databases. Databases 30 include information which facilitates number portability for many types of subscribers in their respective domains, including mobile subscribers.

As will become more apparent below, the mobile telecommunications domains 20A–20C described above comprise a mobile subscriber number portability domain. In the number portability domain, mobile subscribers can change service providers, e.g., change from one of the domains to another, e.g., change from domain 20A to domain 20C, and still maintain their "directory" number. FIG. 2 shows the circumstance where mobile subscriber 71 has changed service providers. In particular, as depicted in FIG. 2, mobile subscriber 71 has changed his subscription from the provider which operates domain 20C to the provider which operates domain 20B. In fact, at the time shown in FIG. 2, mobile subscriber 71 is served by MSC 40B(1).

Upon the change of subscription as depicted in FIG. 2, deletion of the subscriber (owning mobile station 71) from MSC 40C was communicated to service management system (SMS) 32C, which advised master service management system (SMS) 32M. SMS 32M subsequently communicated the deletion of the subscriber to all SMSs 32, including SMSs 32A, 32B, and 32F, which in turn updated respective databases 30A, 30B, 32F, accordingly. Then, when the subscriber joined the service provider which operates domain 20B, SMS 32C advised master SMS 32M of the enlistment. SMS 32M subsequently advised all SMSs 32 of the enlistment in domain 20B of the subscriber, including SMSs 32A, 32C, 32F, which in turn updated respective databases 30A, 30C, and 30F, accordingly. Therefore, in accordance with the above process, the subscriber of mobile station 71 is able to retain the same directory number upon changing service providers from domain 20C to domain 20B.

FIG. 2 further shows placement of a call from mobile subscriber 70 in domain 20A to mobile subscriber 71 which has changed from service provider 20C to service provider 20B. The originating MSC 40A receives the mobile subscriber call via BS 60A-m(q) and BSC 50A-m. Then, in accordance with conventional techniques, MSC 40A initiates a number portability request message (Action 3-1; FIG. 2), such as, for example, the Number Portability Request Invoke message utilized in ANSI41, to number portability database 30A. However, in view of the previous updating of database 30A to reflect the mobile subscriber 71 changing service providers (as discussed above), the parameter returned by database 30A at action 3-2 includes the address of the new GMSC 26B, not the address of the old GMSC 26C. Thus, at 3-2, number portability database 30A initiates a number portability return message, such as, for example, the Number Portability Request Return Result (npreq) utilized in ANSI41, to the originating MSC 40A. This return message includes a local portability routing number (LRN) to GMSC 26B. Thus, MSC 40A can then connect the originating call from mobile subscriber 70 to GMSC 26B, and thereby to MSC40B(1), BSC 50B(1)-1, BS 60B(1)-1(a), and finally to called mobile subscriber 71. Therefore, mobile subscriber 70 is able to call mobile subscriber 71, which has changed service providers from 20C to 20B, using the same directory number.

Thus, as described above, a call-originating domain accesses a mobile subscriber number portability database to obtain the address of the gateway node of the telecommunications domain which currently serves a called mobile subscriber. Use of the Number Portability database will therefore advantageously permit a mobile subscriber in a telecommunications system to retain the same directory number whenever the subscriber changes from one service provider/operator domain to another service provider/operator domain.

Conventionally, however, the above described number portability database is usable only for telecommunication service providers and does not provide portability towards Internet service providers. Applying conventional number portability techniques to the portability of Internet addressing would be advantageous since both current and proposed (IPv6) Internet addressing systems are provider-based and therefore, whenever a subscriber changes providers, the subscriber's domain name changes as well as the subscriber's IP address. Therefore it would be desirable to extend application of the number portability database to permit a subscriber to change from one Internet access provider to another access provider without changing the subscriber's Internet IP address and/or domain name. Additionally, number portability can be applied to the internet service provider itself. Thus, if an internet service provider's IP address changes, then number portability can permit continued access by subscribers and/or other data communication network. Extending application of the conventional number portability database to Internet service providers therefore advantageously permits a cohesive integration between telecommunication and data communication networks. This integration would permit telecommunication network operators and data communications providers (e.g., internet service providers) to improve service to their subscribers by providing access between the two in a transparent fashion (i.e., telecom to datacom or datacom to telecom). Extending application of the conventional number portability database to internet service providers additionally permits number portability between data communications providers (i.e., datacom to datacom).

SUMMARY

These desirable characteristics and others are provided by the following exemplary embodiments of the invention.

According to one exemplary embodiment of the invention a method of routing calls through a communications network is provided. The method of this exemplary embodiment comprises the steps of: a) initiating a call from a first subscriber in a call-originating domain to a second subscriber in a data communications domain; b) transmitting a first message from a first node in said call-originating domain to a database in said call-originating domain; c) locating a current data communication network node parameter in said database, wherein said network node parameter is associated with said second subscriber; d) transmitting a second message that includes said located data communication network node parameter from said database to said first node; e) routing said call from said first node to a data communications address indicated by said located data communication network node parameter; and f) updating said database when said second subscriber changes membership from a first communication network provider to a data communication network provider.

According to a second exemplary embodiment of the invention a system for routing calls through a communications network is provided. The system of this exemplary embodiment comprises: means for initiating a call from a first subscriber in a call-originating domain to a second subscriber in a data communications domain; means for transmitting a first message from a first node in said call-originating domain to a database in said call-originating domain; means for locating a current data communication network node parameter in said database, wherein said network node parameter is associated with said second subscriber; means for transmitting a second message that includes said located data communication network node parameter from said database to said first node; means for routing said call from said first node to a data communications address indicated by said located data communication network node parameter; and means for updating said database when said second subscriber changes membership from a first communication network provider to a data communication network provider.

According to a third exemplary embodiment of the invention a method of routing calls through a communications network, the communications network having a set of domains, at least one of the domains in said set of domains being a data communications domain, is provided. The method of this exemplary embodiment comprises the steps of: accessing, in a call-originating domain included in the set of domains, a database to obtain an address of a node of the data communications domain which currently serves a called subscriber; and including the address of the data communications domain which currently serves said called subscriber as a parameter in a routing message for routing a call from the call-originating domain to said node of said data communications domain.

According to a fourth exemplary embodiment of the invention a system for routing calls through a communications network, the communications network having a set of domains, at least one of the domains in said set of domains being a data communications domain, is provided. The system of this exemplary embodiment comprises: means for accessing, in a call-originating domain included in the set of domains, a database to obtain an address of a node of the data communications domain which currently serves a called subscriber; and means for including the address of the data communications domain which currently serves said called subscriber as a parameter in a routing message for routing a call from the call-originating domain to said node of said data communications domain.

BRIEF DESCRIPTION OF THE DRAWINGS

The objects and advantages of the invention will be understood by reading the following detailed description in conjunction with the drawings in which.

DETAILED DESCRIPTION

To provide portability of addresses across telecommunication and data communication networks, exemplary embodiments of the invention extend the conventional number portability principles, described in the Background section above, to include Internet addresses as well as the E.164 type of addresses currently returned as the local number portability routing digits. To account for Internet addressing, exemplary embodiments of the invention modify the conventional number portability request invoke messages (e.g., ANSI41 NPREQ) and the number portability request return result messages (e.g., ANSI41 npreq) to include additional information. For request invoke messages, this additional information will include a new parameter, "Transaction Capability," that indicates whether Internet addressing is supported. For return result messages, the additional information will include a new optional routing address parameter, "Routing IP Address," that will permit routing of the call on the IP network towards the ported Internet service provider (e.g., voice over IP), and a new "Ported Gateway Capabilities" parameter that specifies the protocol capabilities of the ported gateway.

Figure 3:
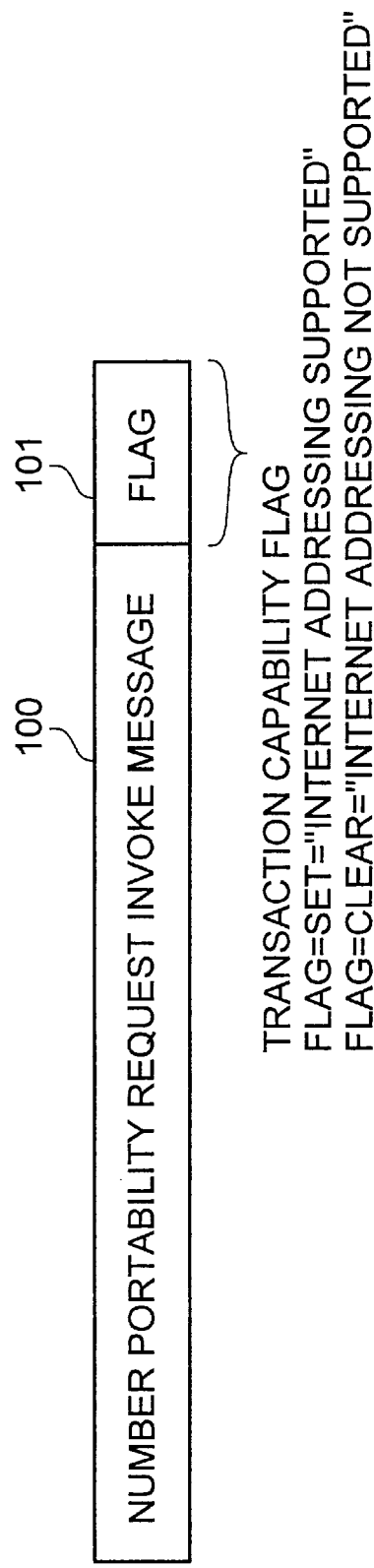
FIG. 3 is a diagram of message parameters of exemplary embodiments of the invention that are included in the Number Portability Request Invoke message.

FIG. 3 illustrates modification of the conventional Number Portability Request Invoke message 100 in accordance with exemplary embodiments of the invention. As discussed above, "Transaction Capability" flag 101 is added to the message 100 to indicate whether the originating mobile switching center/end user terminal/network node is capable of initiating Internet calls to a destination IP address. If the flag 101 is "set," then the capability of supporting Internet addressing is indicated. Conversely, if the flag is "cleared," then Internet addressing is not supported.

Figure 4:
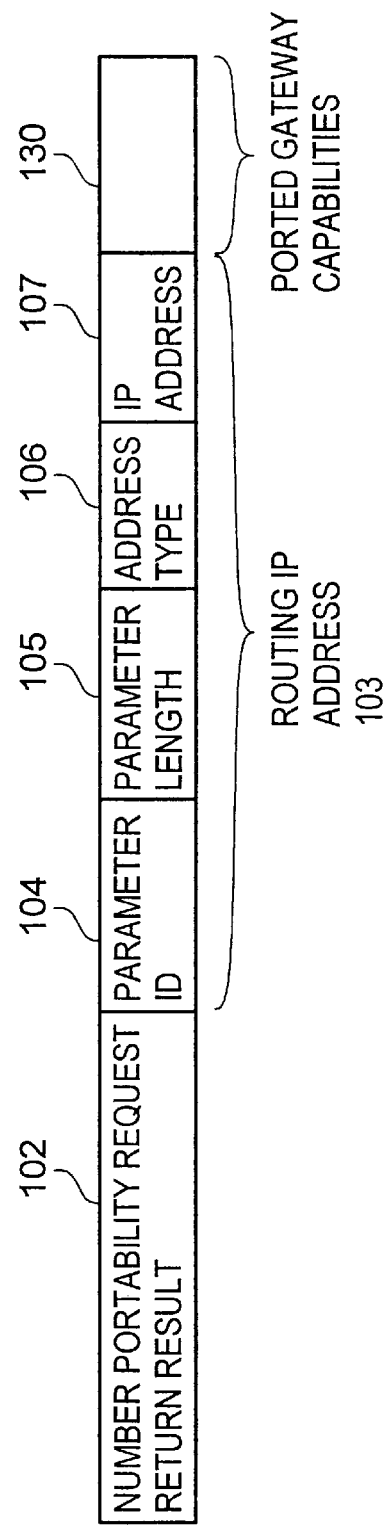
FIG. 4 is a diagram of message parameters of exemplary embodiments of the invention that are included in the Number Portability Request Return Result message.

FIG. 4 illustrates modification of the conventional Number Portability Request Return Result message in accordance with further exemplary embodiments of the invention. In these further exemplary embodiments, a "Routing IP Address" parameter 103 is added to the Return Result message 102. This "Routing IP Address" parameter is composed of sub-elements including Parameter ID 104, Parameter Length 105, Address Type 106, and IP Address 107. The Parameter ID 104 is an identifier or tag that specifies the type of information included in the message, the Parameter Length 105 specifies the length of the "Routing IP Address" parameter, the Address Type 106 specifies the type of IP address (e.g., IPv4, IPv6, ATM, etc.) contained in the "Routing IP Address" parameter, and the IP Address 107 specifies the IP address to which the called subscriber is ported.

In addition to the "Routing IP Address," the protocol capabilities of the ported gateway will be included in a new "Ported Gateway Capabilities" parameter 130. This parameter will specify the protocol capabilities of the ported gateway including options such as SIP, H.323, L2TP tunneling (IETF), PPP (point to point protocol, IETF), or ATM UNI.

It is noted that, though FIGS. 3 and 4 illustrate the additional parameters of exemplary embodiments as being appended to the end of the conventional Request Invoke and Return Result messages, one skilled in the art will recognize that these additional parameters could be located at any appropriate location within the messages.

Figure 1:
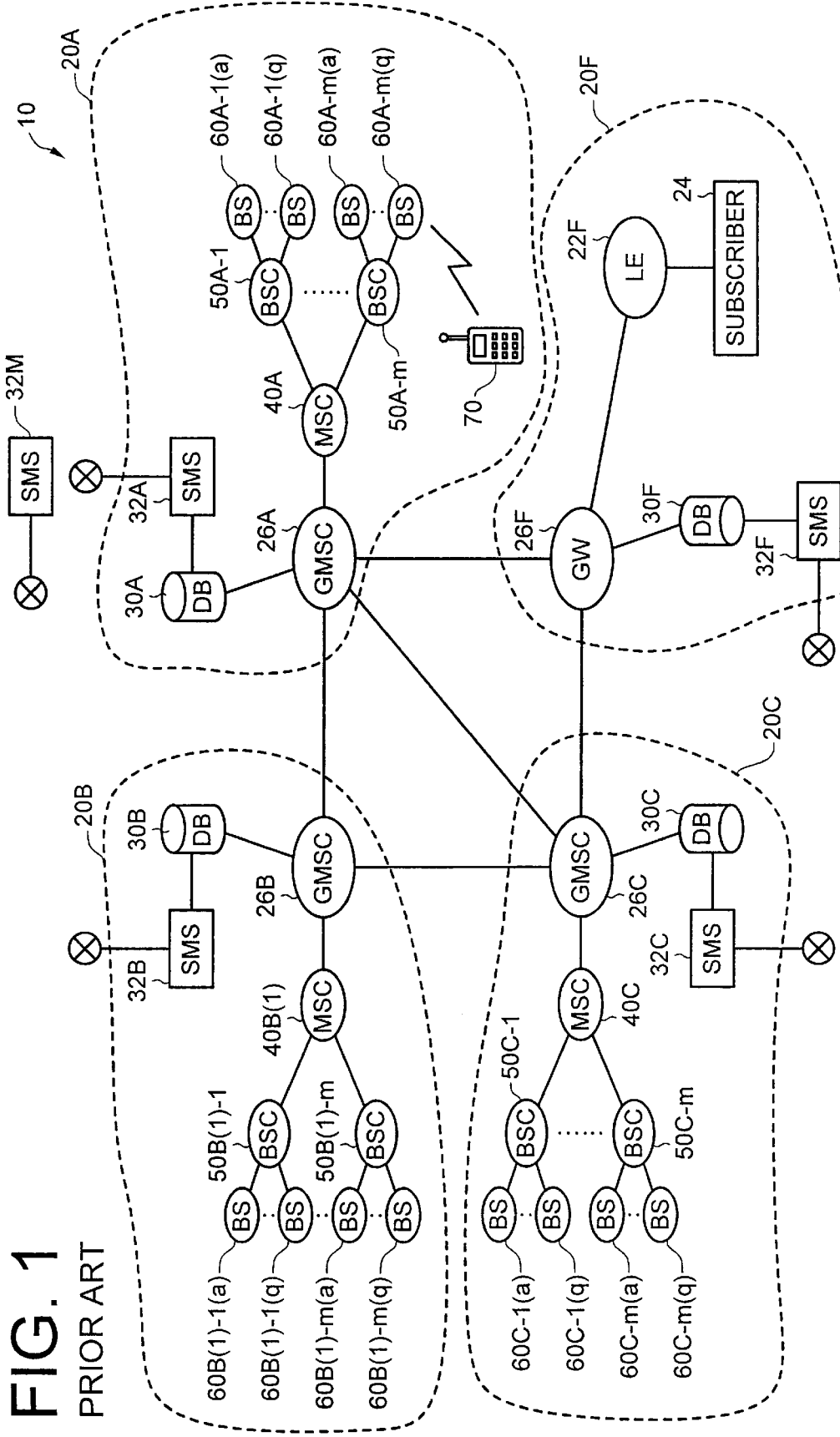
FIG. 1 is a diagram of a conventional telecommunications network that implements number portability.
Figure 2:
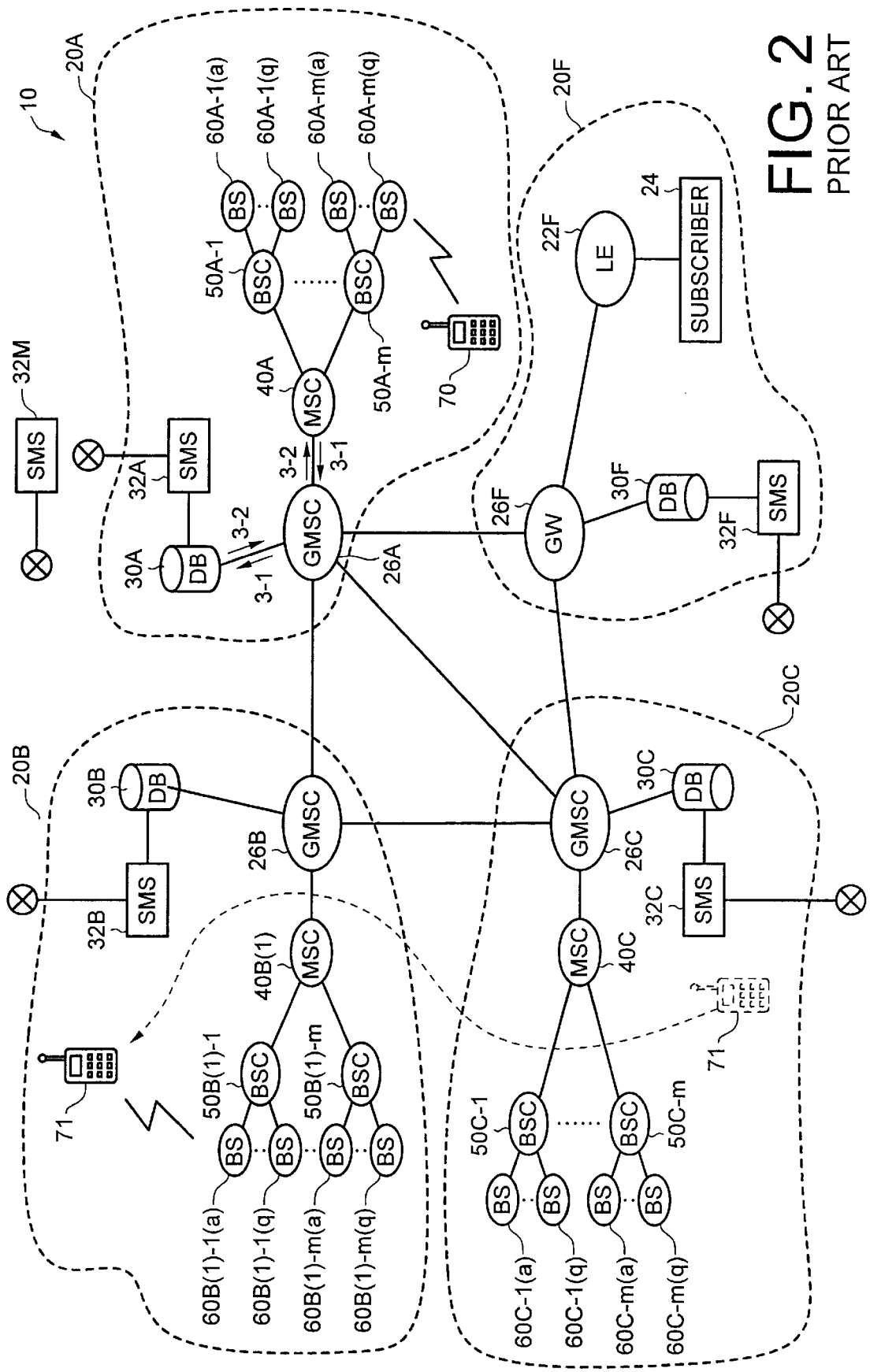
FIG. 2 is a diagram of a call from a first mobile subscriber to a second mobile subscriber that has changed service providers in a telecommunications network.

In further exemplary embodiments of the invention, the conventional Number Portability database (30 in FIG. 2) can also be modified to support a new entry for IP addresses. Additionally, a "Name Address" entry could also be added to the NPDB. This "Name Address" entry could be used for performing conversion to an IP address before the NPDB answers a number portability request message. This conversion could be performed, for example, by querying a directory name server. For example, if the ported address is a text address (e-mail, URL, etc.), the NPDB would query a directory name server to request the IP address corresponding to the text address. This IP address can then be returned via the Return Result message (102 and 103 of FIG. 4).

Figure 5:
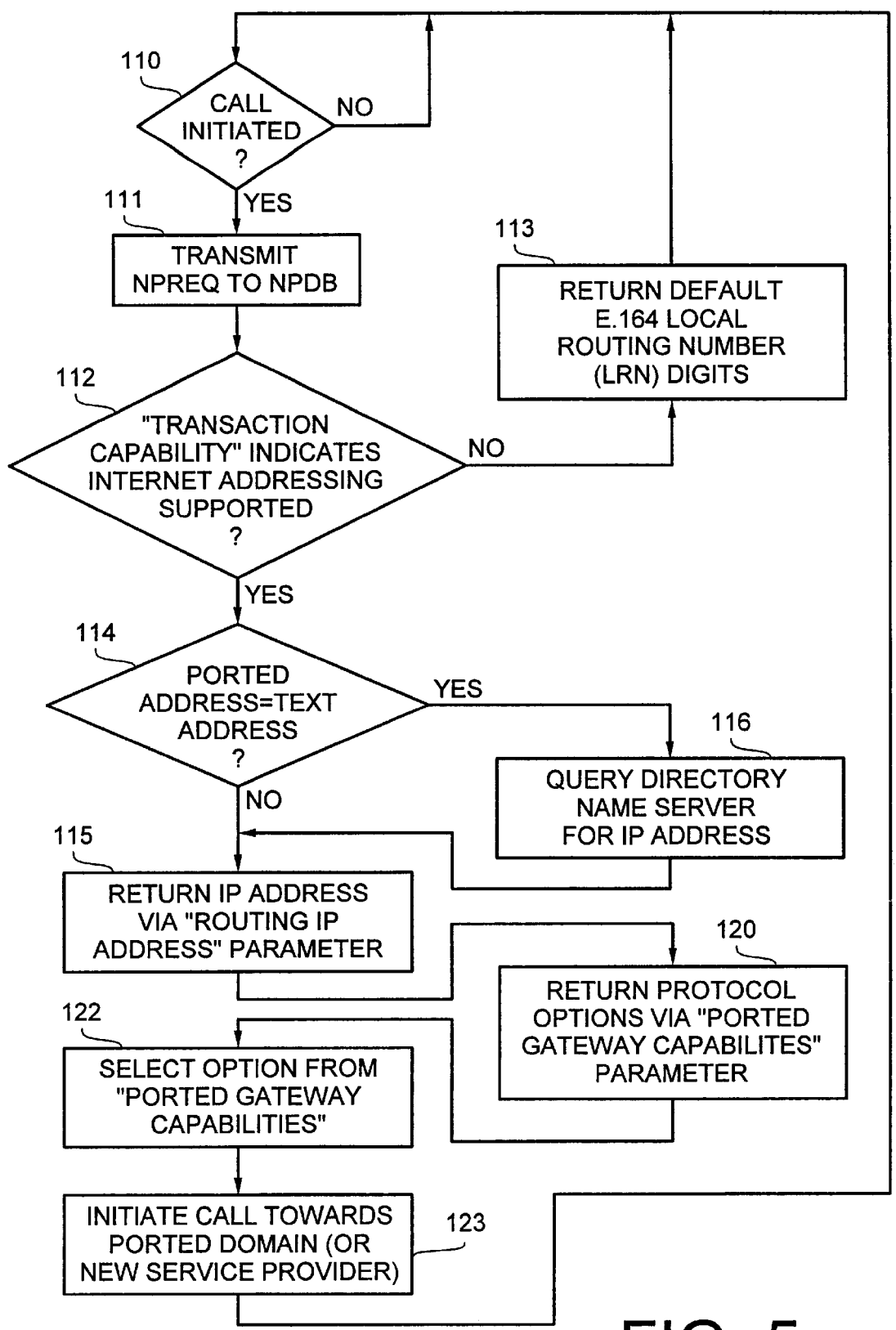
FIG. 5 is a flow diagram of exemplary embodiments of the invention.

A flow diagram of the operation of the exemplary embodiments discussed above is shown in FIG. 5. When a communication is initiated 110, the switching center/end user terminal/network node (117, FIG. 6) will initiate 111 a Number Portability Request message (118, FIG. 6) to the NPDB (30, FIG. 6) which will include the "Transaction Capability" parameter. The NPDB then determines 112 whether the "Transaction Capability" parameter indicates that the MSC/end user terminal/network node is capable of initiating Internet calls to a destination IP address. If internet addressing is not supported, meaning that the originating domain is not able to set-up an internet call to the ported internet service provider, the NPDB will return 113 an LRN in E.164 format that is the address of the closest gateway to the ported internet service provider (ISP) capable of performing protocol conversion. If, however, Internet addressing is supported, the NPDB further analyzes the ported address to determine whether the ported address is a text address 114. If the ported address is a text address, then the NPDB queries a directory name server to request the IP address which corresponds to the text address.

Figure 6:
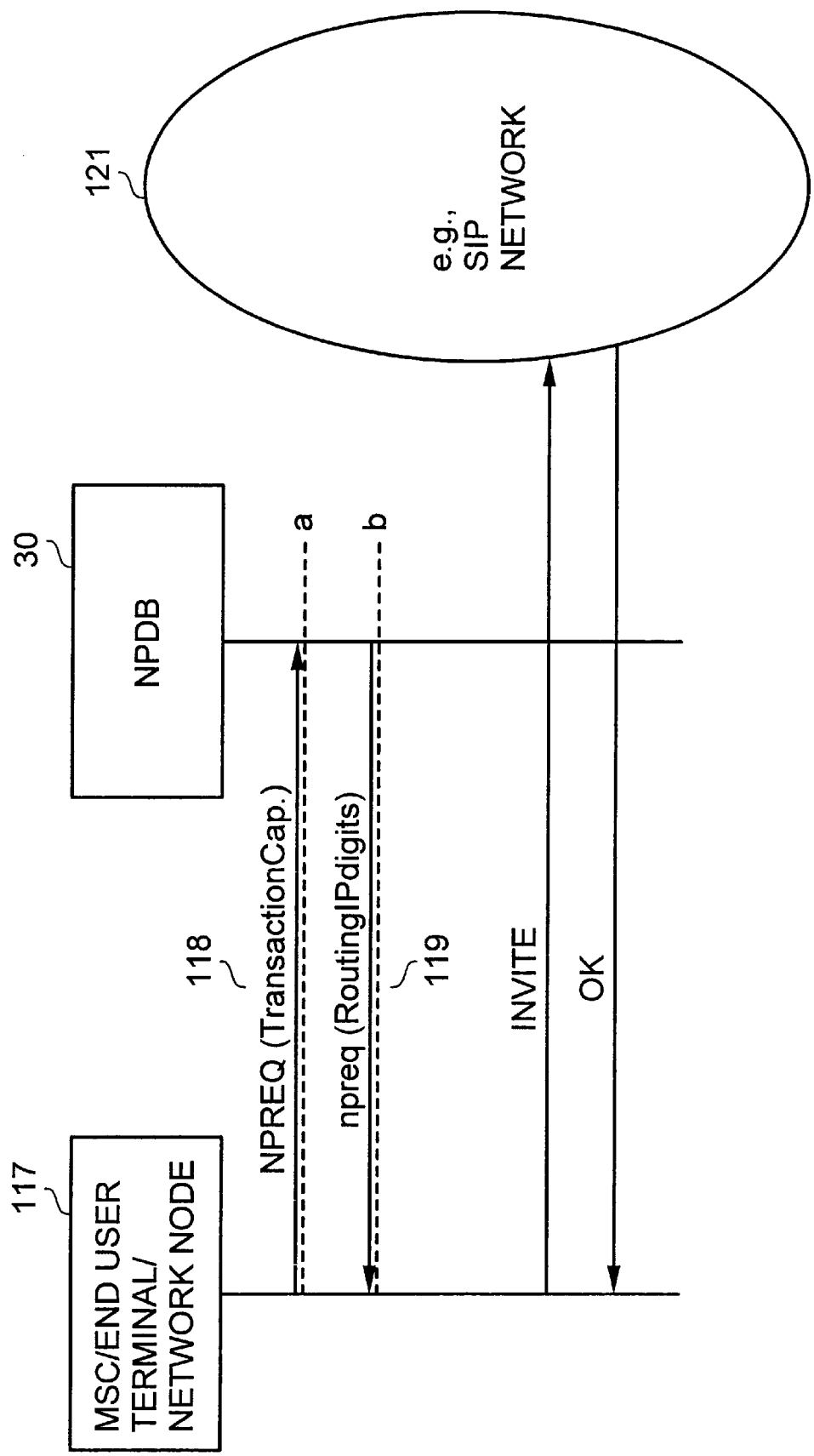
FIG. 6 is a diagram illustrating the messaging between system components in accordance with exemplary embodiments of the invention.

The NPDB then returns 115 the IP address to which the called subscriber is ported to the originating MSC/end user terminal/network node via the "Routing IP Address" parameter (119, FIG. 6). The NPDB additionally returns 120 the available protocol options of the ported gateway via the "Ported Gateway Capabilities" parameter. The originating domain (i.e., the mobile switching center, end user terminal, or network node), then selects 122 one of the options specified in the parameter for initiating 123 the call towards the ported domain (or the new service provider).

Thus, as described above, exemplary embodiments of the invention extend the number portability principle, implemented in existing telecommunication networks, to support IP address portability between telecommunication service providers and data communication service providers or between data communication service providers and other data communication service providers. One skilled in the art will additionally recognize that a number of standard protocols could be used to support the enhancements of the exemplary embodiments of the invention described above with only minor modifications. For telecommunications domains, these protocols could include, e.g., ANSI41, GSM MAP, and ISUP (ISDN user part). For data communications domains these protocols could include, e.g., SIP and H.323.

Although a number of embodiments are described herein for purposes of illustration, these embodiments are not meant to be limiting. Those skilled in the art will recognize modifications that can be made in the illustrated embodiments. Such modifications are meant to be covered by the spirit and scope of the appended claims.

What is claimed is:

1. A method of routing calls through a communications network comprising the steps of:
    a) initiating a call from a first subscriber in a call-originating domain to a second subscriber in a data communications domain;
    b) transmitting a first message from a first node in said call-originating domain to a database in said call-originating domain;
    c) locating a current data communication network node parameter in said database, wherein said network node parameter is associated with said second subscriber;
    d) transmitting a second message that includes said located data communication network node parameter from said database to said first node;
    e) routing said call from said first node to a data communications address indicated by said located data communication network node parameter; and
    f) updating said database when said second subscriber changes membership from a first communication network provider to a data communication network provider.

2. The method of claim 1, wherein step c) further comprises the sub-step of:
    i) converting said located data communication network node parameter to a data communications address using a naming address database.

3. The method of claim 1, wherein the network node parameter is an IP address.

4. The method of claim 2, wherein the data communications address is an IP address.

5. The method of claim 1, wherein said first message includes a first parameter that indicates whether said first node supports data communication network addressing.

6. A system for routing calls through a communications network comprising:
    means for initiating a call from a first subscriber in a call-originating domain to a second subscriber in a data communications domain;
    means for transmitting a first message from a first node in said calloriginating domain to a database in said call-originating domain;
    means for locating a current data communication network node parameter in said database, wherein said network node parameter is associated with said second subscriber;
    means for transmitting a second message that includes said located data communication network node parameter from said database to said first node;
    means for routing said call from said first node to a data communications address indicated by said located data communication network node parameter; and
    means for updating said database when said second subscriber changes membership from a first communication network provider to a data communication network provider.

7. The system of claim 6, wherein said means for locating a network node parameter further comprises:
    means for converting said located data communication network node parameter to a data communications address using a naming address database.

8. The system of claim 6, wherein the network node parameter is an IP address.

9. The system of claim 7, wherein the data communications address is an IP address.

10. The system of claim 6, wherein said first message includes a first parameter that indicates whether said first node supports data communication network addressing.

11. A method of routing calls through a communications network, the communications network having a set of domains, at least one of the domains in said set of domains being a data communications domain, the method comprising the steps of:
    accessing, in a call-originating domain included in the set of domains, a database to obtain an address of a node of the data communications domain which currently serves a called subscriber; and
    including the address of the data communications domain which currently serves said called subscriber as a parameter in a routing message for routing a call from the call-originating domain to said node of said data communications domain.

12. The method of claim 11, further comprising the step of:
    providing a first message to said database indicating whether said call-originating domain supports data communication network addressing.

13. The method of claim 11, wherein the address included as a parameter in the routing message is the IP address of the data communications domain which currently serves said called subscriber.

14. The method of claim 11, wherein the method further comprises the step of:
    updating said database when said subscriber changes membership from a communications domain in said set of domains to a data communications domain whereby the address of the node of the data communications domain is associated in said database with said subscriber.

15. The method of claim 11, wherein said call-originating domain is a telecommunications domain.

16. A system for routing calls through a communications network, the communications network having a set of domains, at least one of the domains in said set of domains being a data communications domain, comprising:

means for accessing, in a call-originating domain included in the set of domains, a database to obtain an address of a node of the data communications domain which currently serves a called subscriber; and means for including the address of the data communications domain which currently serves said called subscriber as a parameter in a routing message for routing a call from the call-originating domain to said node of said data communications domain.

17. The system of claim 16, further comprising:

means for providing a first message to said database indicating whether said call-originating domain supports data communication network addressing.

18. The system of claim 16, wherein the address included as a parameter in the routing message is the IP address of the data communications domain which currently serves said called subscriber.

19. The system of claim 16, wherein the system further comprises:

means for updating said database when said subscriber changes membership from a communications domain in said set of domains to a data communications domain whereby the address of the node of the data communications domain is associated in said database with said subscriber.

20. The system of claim 16, wherein said call-originating domain is a telecommunications domain.

\* \* \* \* \*